(12) United States Patent
Goraya et al.

(10) Patent No.: US 9,114,705 B2
(45) Date of Patent: Aug. 25, 2015

(54) SYSTEM AND METHOD OF PREVENTING ARTICULATED MACHINE ROLL-OVER

(71) Applicant: Caterpillar Inc., Peoria, IL (US)

(72) Inventors: Fazal A. Goraya, Dunlap, IL (US); David R. Wisley, Peoria, IL (US); Ryan T. Anderson, Germantown Hills, IL (US); Timothy D. Schwartz, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 105 days.

(21) Appl. No.: 14/072,839

(22) Filed: Nov. 6, 2013

(65) Prior Publication Data

US 2015/0127229 A1    May 7, 2015

(51) Int. Cl.
| G06F 19/00 | (2011.01) |
| B62D 53/06 | (2006.01) |
| B60K 23/04 | (2006.01) |
| B62D 53/02 | (2006.01) |
| B60W 30/04 | (2006.01) |
| B60R 21/013 | (2006.01) |

(52) U.S. Cl.
CPC .............. *B60K 23/04* (2013.01); *B62D 53/026* (2013.01); *B60G 2800/012* (2013.01); *B60G 2800/0124* (2013.01); *B60K 2023/046* (2013.01); *B60R 21/013* (2013.01); *B60W 30/04* (2013.01)

(58) Field of Classification Search
CPC ............ B60K 23/04; B60K 2023/046; B62D 53/026; B60G 2300/02; B60G 2300/04; B60G 2800/012; B60G 2800/0124; B60W 30/04; B60R 21/013; B60T 8/243
See application file for complete search history.

(56) References Cited

U.S. PATENT DOCUMENTS

| 5,383,680 | A  | * | 1/1995  | Bock et al. ................. 280/5.503 |
| 6,668,225 | B2 | * | 12/2003 | Oh et al. ......................... 701/70 |
| 7,477,972 | B2 |   | 1/2009  | Stavroff et al. |
| 7,770,909 | B2 |   | 8/2010  | Anderson et al. |
| 7,963,547 | B2 | * | 6/2011  | Anderson ..................... 280/683 |
| 2005/0154512 | A1 | * | 7/2005  | Schubert et al. ................ 701/38 |
| 2007/0250236 | A1 | * | 10/2007 | Newberry et al. .............. 701/51 |
| 2012/0193889 | A1 | * | 8/2012  | Harrison .................... 280/423.1 |

FOREIGN PATENT DOCUMENTS

GB          2497134        6/2013

* cited by examiner

*Primary Examiner* — Khoi Tran
*Assistant Examiner* — Robert Nguyen
(74) *Attorney, Agent, or Firm* — Jeff A. Greene (57) ABSTRACT

An articulated machine having a first frame and a second frame supported by first and second wheel assemblies respectively is provided. The machine includes a first sensor and a second sensor to provide position information of the first frame and the second frame respectively. The machine includes a drive train to couple the front and rear wheel assembly, and having an inter axle differential to facilitate the front and the rear wheel assembly to move at different speeds. The machine includes a controller to compare position of the first frame with position of the second frame to determine relative position of the second frame with respect to the first frame. The controller compares the relative position of the second frame with a predefined position limit. The controller selectively locks the inter axle differential when the determined relative position of the second frame is greater than the predefined position limit.

20 Claims, 5 Drawing Sheets

SYSTEM AND METHOD OF PREVENTING ARTICULATED MACHINE ROLL-OVER

TECHNICAL FIELD

The present disclosure relates to an articulated machine, and more particularly to a system and a method of preventing roll over of the articulated machine.

BACKGROUND

Articulated machines such as articulated trucks with a payload carrier, and ejector mechanisms typically include two frames such as a tractor unit and the payload carrier which is connected to the tractor unit via an articulation joint. The articulation joint enables the frames to roll and yaw with respect to each other.

Articulated machines are generally employed during construction and excavation and may be operated on uneven terrains. As a result, one of the frames may be positioned at an unsafe roll and/or yaw angle and may cause the entire machine to roll-over. Alternatively, if the articulated machine has an open container, such as an open carrier on one of the frame, any material in the container may fall out on uneven terrain if the machine operates beyond the safety limits of the roll and yaw angles. Furthermore, since the roll and yaw angles of the frames are independent of each other, the operator may be unaware of the unsafe roll and yaw angles which may result in possible roll over of the machine.

United Kingdom Publication Number 2,497,134 relates to an apparatus for, and a corresponding method of, determining the relative orientation of two members of an articulated work machine is provided. The apparatus and method utilizes inertia sensors by referencing the output from inertia sensors mounted on the members to one another. The articulated work machine comprises a first frame and a second frame comprising a body and a chassis, the body pivotally connected to the chassis. The first and second frames are connected by a coupling and are movable relative to each other in at least one direction. The articulated work machine further comprises a first multi-axis inertia sensor attached to the first frame providing an output relating to the position of the first frame, and a second multi-axis inertia sensor attached to the body providing an output relating to the position of the body. A controller compares the outputs of the first and second multi-axis inertia sensors to calculate the position of the body and the first frame relative to each other.

SUMMARY

In one aspect of the present disclosure, an articulated machine is provided. The machine has a first frame and a second frame supported by first and second wheel assemblies respectively. The machine includes a first sensor to provide position information of the first frame and a second sensor to provide position information of the second frame. The machine includes a drive train to couple the front and rear wheel assembly, and having a differential to facilitate the front and the rear wheel assembly to move at different speeds. The machine includes a controller to compare position of the first frame with position of the second frame to determine relative position of the second frame with respect to the first frame. The controller compares the relative position of the second frame with a predefined position limit. The controller selectively locks the differential when the determined relative position of the second frame is greater than the predefined position limit.

In another aspect of the present disclosure, a method of preventing an articulated machine from rolling over is provided. The machine has a first frame and a second frame. The method includes receiving a position of the first frame from a first sensor provided on the first frame and a position of the second frame from a second sensor provided on the second frame. Further, the method includes determining a relative position of the second frame with respect to the first frame by comparing the position of the first frame and the position of the second frame received from the first sensor and the second sensor. The determined position of the second frame is compared with a predefined position limit. Furthermore, a differential between the first frame and the second frame is automatically locked when the determined position of the second frame is greater than the predefined position limit.

Other features and aspects of this disclosure will be apparent from the following description and the accompanying drawings.

DETAILED DESCRIPTION

Figure 1:
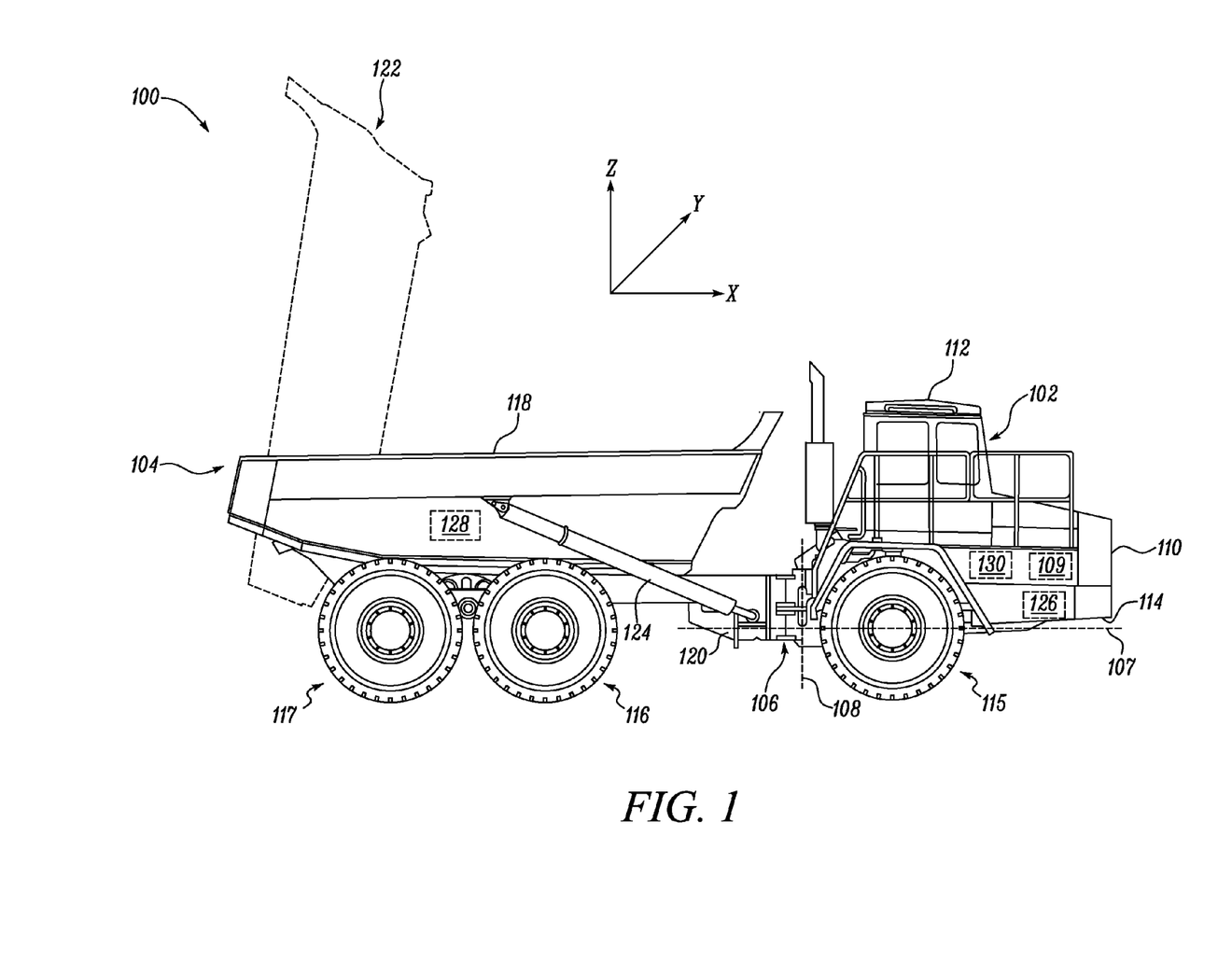
FIG. 1 illustrates a side view of an exemplary machine, according to an embodiment of the present disclosure.

The present disclosure relates to a system and method of preventing roll over of an articulated machine. FIG. 1 illustrates an exemplary machine 100 embodied as an articulated tipper truck, according to an exemplary embodiment of the present disclosure. In various other embodiments, the machine 100 may be any type of an articulated machine having a first frame 102 such as a tractor unit and a second frame 104 such as a payload carrier attached to the first frame 102 by a coupling assembly 106. The first frame 102 and the second frame 104 are moveable relative to each other in multiple directions. In an exemplary embodiment, the coupling assembly 106 may be an articulation joint. The coupling assembly 106 may include a pivot frame coupling (not shown) and a rotational frame coupling (not shown). The pivot frame coupling provides articulated movement or pivoting of the second frame 104 relative to the first frame 102 about a central axis of articulation 107. The rotational frame coupling provides rotational movement of the second frame 104 relative to the first frame 102 about a longitudinal axis 108. The coupling assembly 106 may allow each of the frames 102, 104 to be oriented at a different yaw angle and/or roll angle with respect to the central axis of articulation 107. The coupling assembly 106 may further include an actuation mechanism (not shown) configured to control the coupling assembly 106. In an exemplary aspect of the present disclosure, the actuation mechanism may be hydraulically, or electrically and/or electro-mechanically operated.

The machine 100 may further include an engine 109 positioned in an engine compartment 110 and supported on the first frame 102. The engine 109 may be an internal combustion engine, for example, a petrol engine, a diesel engine, or a gas powered engine. In the illustrated embodiment, a cab 112 is mounted on a front end 114 of the first frame 102 of the machine 100. The cab 112 may be disposed above the engine compartment 110 and extend rearward beyond the engine 109. In some embodiments, the cab 112 may enclose the engine 109 by forming a portion of the engine compartment 110. In other embodiments, the cab 112 may be pivotally mounted to the first frame 102, such that the cab 112 may be tilted to provide an access to the engine 109. The cab 112 houses various machine controls.

The second frame 104 may include a body 118 such as the payload carrier configured to carry a load and which is pivotally connected to a chassis 120 at a pivot point (not shown). During operation of the machine 100, the body 118 may be lowered or raised, such as to a raised position 122 (shown in dashed lines) with respect to the first frame 102 of the machine 100 by an actuator 124. The actuator 124 is coupled between the chassis 120 and the second frame 104. The raised position 122 of the second frame 104 is a tipping position where one end of the second frame 104 is raised from the chassis 120 and the other end remains on the chassis 120. Thus, the body 118 may eject out any material or the load when in the raised position 122.

Further, the machine 100 may include a number of sensor assemblies associated with the machine 100. In an exemplary aspect of the present disclosure, the machine 100 may include a first sensor assembly 126 associated with the first frame 102 and a second sensor assembly 128 associated with the second frame 104. The sensor assemblies 126 and 128 are configured to provide position information of the frames 102 and 104 respectively. In an exemplary aspect of the present disclosure, the first sensor assembly 126 may act as a reference sensor. For example, the position information of the frames 102, 104 may be a relative information of the respective frame with respect to the ground on which the machine 100 is operating. The first sensor assembly 126 may be attached to any part of the first frame 102. The second sensor assembly 128 may be attached close to the pivot point between the body 118 and the chassis 120. In an exemplary embodiment of the present disclosure, the sensor assemblies 126, 128 may include multi-axis inertia sensors configured to determine multi-axis position of the respective frames 102, and 104. In various alternative embodiments, the sensor assemblies 126, 128 may include any type of sensors capable of determining a pitch, a yaw and/or roll angle of the second frame 104 with respect to the first frame 102. For example, the sensor assemblies 126, 128 may include accelerometer or a gyroscope sensors. Further, the sensor assemblies 126, 128 may include piezoelectric, capacitive, potentiometric, hall effect, magnetorestrictive or any other type microelectromechanical sensors.

Generally, the sensor assemblies 126, 128 may include a "proof" mass which moves relative to the respective frames 102, 104. A difference in movement between the frames 102, 104 and the proof mass is related to its acceleration and may be measured in a number of ways such as capacitively, piezo-electrically, and piezo-resistively. Further, the sensor assemblies 126, 128 may measure linear acceleration in X, Y and Z directions and angular velocity about the X, Y and Z axis. Furthermore, the sensor assemblies 126, 128 may be configured to provide output signals indicative of the position information of the respective frames 102, 104 to a controller 130 of the machine 100 based on the measured linear acceleration and the angular velocity of the frames 102, 104.

In an embodiment of the present disclosure, the controller 130 is operatively coupled to the first and the second sensor assemblies 126, 128. The controller 130 may include any appropriate type of a general purpose computer, special purpose computer, microprocessor, microcontroller, or other programmable data processing apparatus. In an aspect of the present disclosure, the controller 130 may be machine engine control module (ECM). The controller 130 is configured to receive the position of the first frame 102 and the second frame 104 from the sensor assemblies 126, 128 respectively to determine a relative position of the second frame 104 with respect to the first frame 102.

Figure 3:
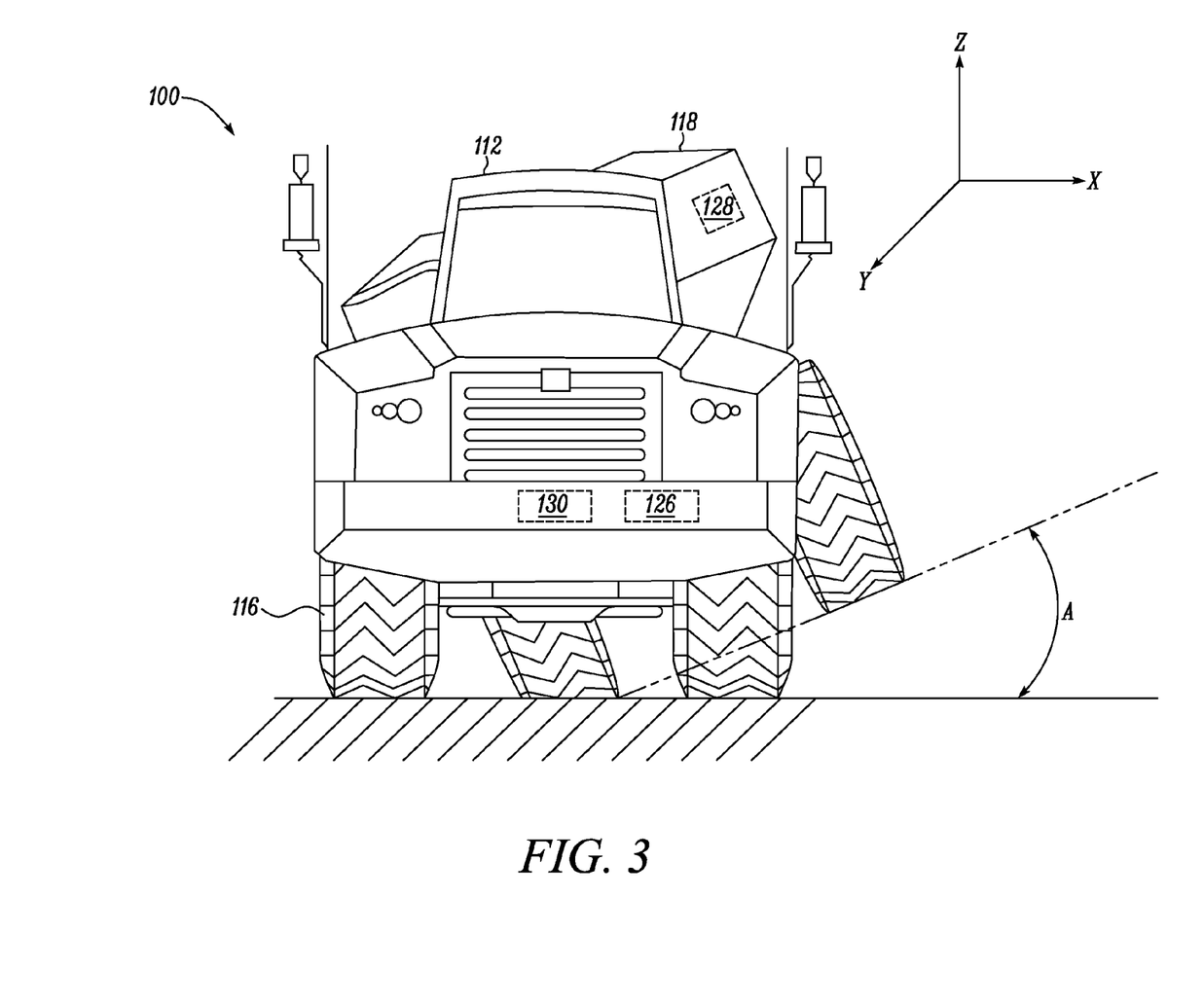
FIG. 3 illustrates a front view of the machine operating on a slopped surface.

For example, the relative position of the second frame 104 with respect to the first frame 102 may be a roll-over angle A (as shown in FIG. 3) and/or a pitch angle of the body 118 with respect to the first frame 102. As will be understood by a person having ordinary skill in the art that the roll-over angle A may be indicative of the angle of the tilted second frame 104 with respect to the first frame 102 in the raised position 122 on the sloped ground.

The second frame 104 may include an ejection mechanism (not shown) having an ejector plate which slides horizontally from one end of the inside of the body 118 of the second frame 104 towards the other end. A hydraulic actuator or the like may be used to move the ejector plate towards the ejection end of the body 118 of the second frame 104. Further, a front wheel assembly 115 having a pair of front wheels is configured to provide rolling support to the cab 112 and is operably coupled to the first frame 102. A rear wheel assembly 117, including a central wheel assembly 116, having a respective pair of wheels, is operably coupled to the second frame 104. The front wheel assembly 115, and the rear wheel assembly 117, 116 are powered by the engine 109 via a drive train further explained in conjunction with FIG. 2.

Figure 2:
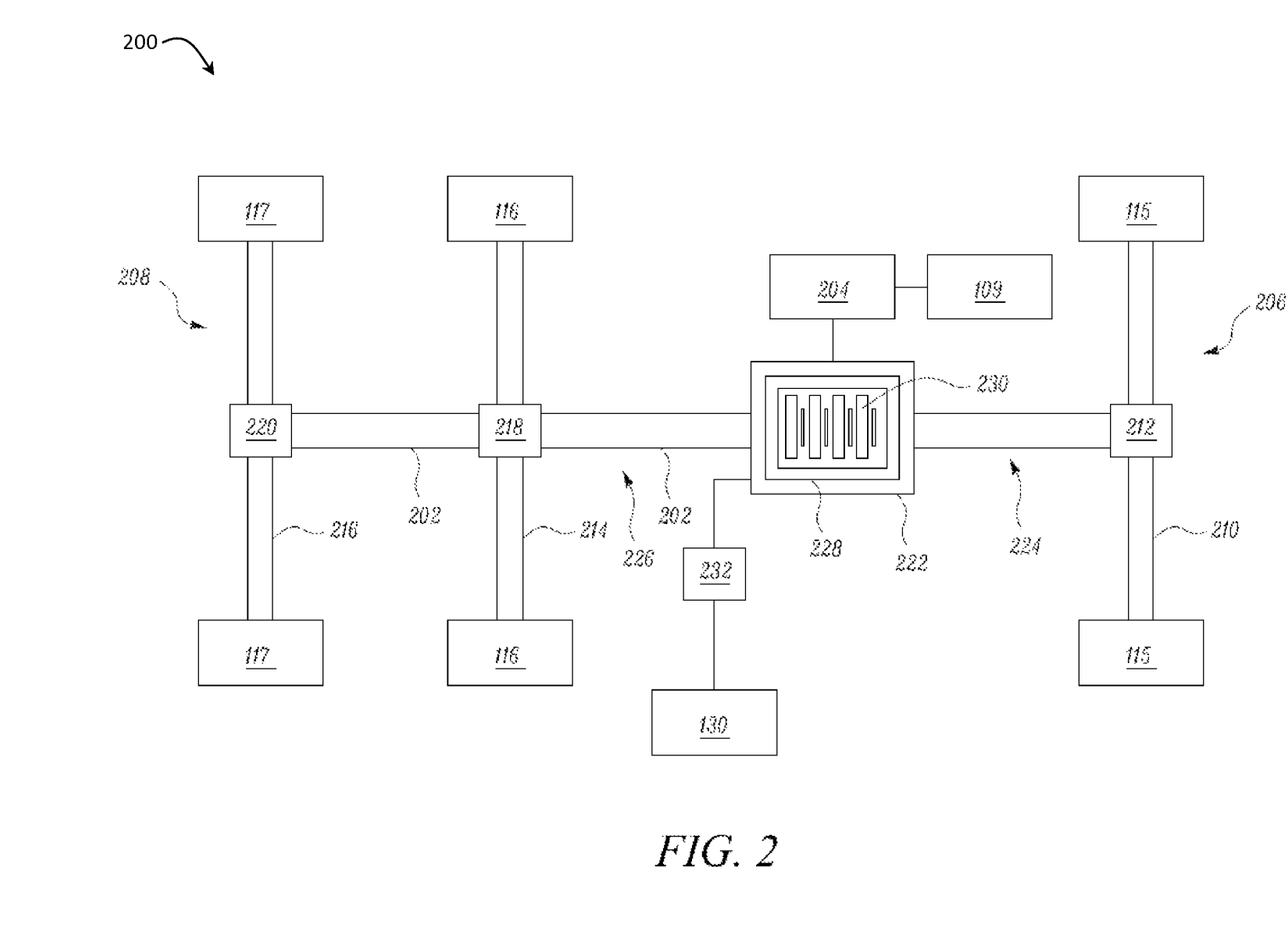
FIG. 2 illustrates an exemplary drive train of the machine.

FIG. 2 illustrates an exemplary drive train 200 of the machine 100. The drive train 200 is configured to couple the front wheel assembly 115 with the central and the rear wheel assembly 116, 117. As shown in FIG. 2, the engine 109 is coupled to a drive shaft 202 via a transmission 204 for driving the front, central and the rear wheel assemblies 115, 116, 117. For example, the transmission 204 may be an automatic transmission, although other types of transmissions may also be provided.

The front wheel assembly 115 includes a front axle assembly 206, and the central wheel assembly 116, the rear wheel assembly 117 includes a rear axle assembly 208. The front axle assembly 206 includes a front axle 210 coupled between the wheels 115 and a first differential 212 coupled to the front axle 210. Further, the rear axle assembly 208 includes a central axle 214 coupled between the central wheels 116 and a rear axle 216 coupled between the rear wheels 117. Further, the rear axle assembly 208 includes a second differential 218 coupled to the central axle 214 and a third differential 220 coupled to the rear axle 216.

The drive shaft 202 is coupled to the front axle 210, the central axle 214 and the rear axle 216. The drive shaft 202 is configured to provide torque from the transmission 204 and the engine 109 to the front axle 210, the central axle 214 and the rear axle 216 for propelling the machine 100. The first differential 212 of the front axle 210 is coupled to the drive shaft 202 and is configured to provide torque from the drive shaft 202 to each of the front wheels 115 to facilitate each of them to rotate at different speeds. Similarly, the second and the third differentials 218, 220 are coupled to the drive shaft 202 and configured to provide torque from the drive shaft 202 to each of the central wheel assembly 116 and each of the rear wheel assembly 117 respectively, facilitating individual wheel assembles 116, 117 to rotate at different speeds.

As illustrated in FIG. 2, the drive shaft 202 includes an inter-axle differential 222 configured to allow the central and the rear axles 214, 216 to rotate at different speeds with respect to the front axle 210 during the operation of the machine 100. The drive shaft 202 includes a first portion 224 coupled between the front axle 210 and the inter-axle differential 222 and a second portion 226 coupled between the inter-axle differential 222 and the rear axle assembly 208. For example, the second portion 226 is also coupled to the central axle 214 and the rear axle 216. The inter-axle differential 222 allows the first portion 224 and the second portion 226 of the drive shaft 202 to rotate at different speeds during the operation of the machine 100, thereby allowing the front axle 210 to rotate at different speeds than the central and the rear axle 214, 216. In the illustrated embodiment, the transmission 204 is coupled to the inter-axle differential 222 for driving the drive shaft 202.

In an aspect of the present disclosure, the inter-axle differential 222 includes a lock 228 for selectively disengaging or locking the inter-axle differential 222. The lock 228 may include a clutch assembly 230, such that when the lock 228 is engaged or closed, the inter-axle differential 222 is in a locked position and the first portion 224 of the drive shaft 202 is locked to the second portion 226 of the drive shaft 202 to rotate therewith. Further, when the lock 228 is disengaged or opened, the inter-axle differential 222 is in an unlocked position and is configured to allow first portion 224 and the second portion 226 of the drive shaft 202 to rotate at different speeds. The clutch assembly 230 may be hydraulically and/or pneumatically actuated by a valve 232 associated with the clutch assembly 230 for controlling the amount of hydraulic fluid delivered to a clutch piston (not shown) of the clutch assembly 230. The inter-axle differential 222 and the clutch assembly 230 of the lock 228 may be controlled by the controller 130 such that the controller 130 monitors and/or controls various aspects of the clutch assembly 230.

FIG. 3 illustrates a front view of the machine 100 operating on a sloped ground. In an exemplary embodiment of the present disclosure, the controller 130 is configured to detect whether the machine 100 is moving on a sloped ground. For example, the controller 130 may use position sensors, inclinometers associated with the machine 100 to detect whether the machine 100 is moving on the sloped ground. When the machine 100 is moving on a sloped ground, then the controller 130 may compare the determined relative position of the second frame 104 with respect to the first frame 102 with a predefined position limit. In an exemplary embodiment of the present disclosure, the relative position of the second frame 104 with respect to the first frame 102 may be a roll-over angle A of the body 118 with respect to the first frame 102. In an exemplary embodiment, the predefined position limit may be a possible roll-over angle A value, as set by the administrator of the machine 100 which would define safety limits of the machine 100 according to possible roll-over events. In an aspect of the present disclosure, the controller 130 and/or the administrator of the machine 100 may also use the speed of the machine 100, slope of the ground, the weight distribution of the machine 100, etc. to determine the predefined position limit for the machine 100.

As the controller 130 determines that the relative position of the second frame 104 is not within a safety limit, based on the comparison, then the controller 130 may detect a possible roll-over event of the second frame 104. For example, the possible roll-over event may indicate that the second frame 104 and/or the machine 100 may roll over on the ground which may result in undesired ejection of the material on the body 118 of the second frame 104. Therefore, in response to the detection of the possible roll-over event of the second frame 104, the controller 130 may be configured to automatically lock the inter-axle differential 222 by engaging the clutch assembly 230 of the lock 228 to lock the first frame 102 with the second frame 104 thereby preventing individual roll-over of the second frame 104. For example, the controller 130 may automatically lock the inter axle differential 222 during dump operations of the machine 100. Furthermore, in an exemplary embodiment, the controller 130 may also inform the operator of the machine 100 and/or the administrator of the machine 100, which may be located at a remote location, of the possible roll over event of the machine 100.

Figure 4:
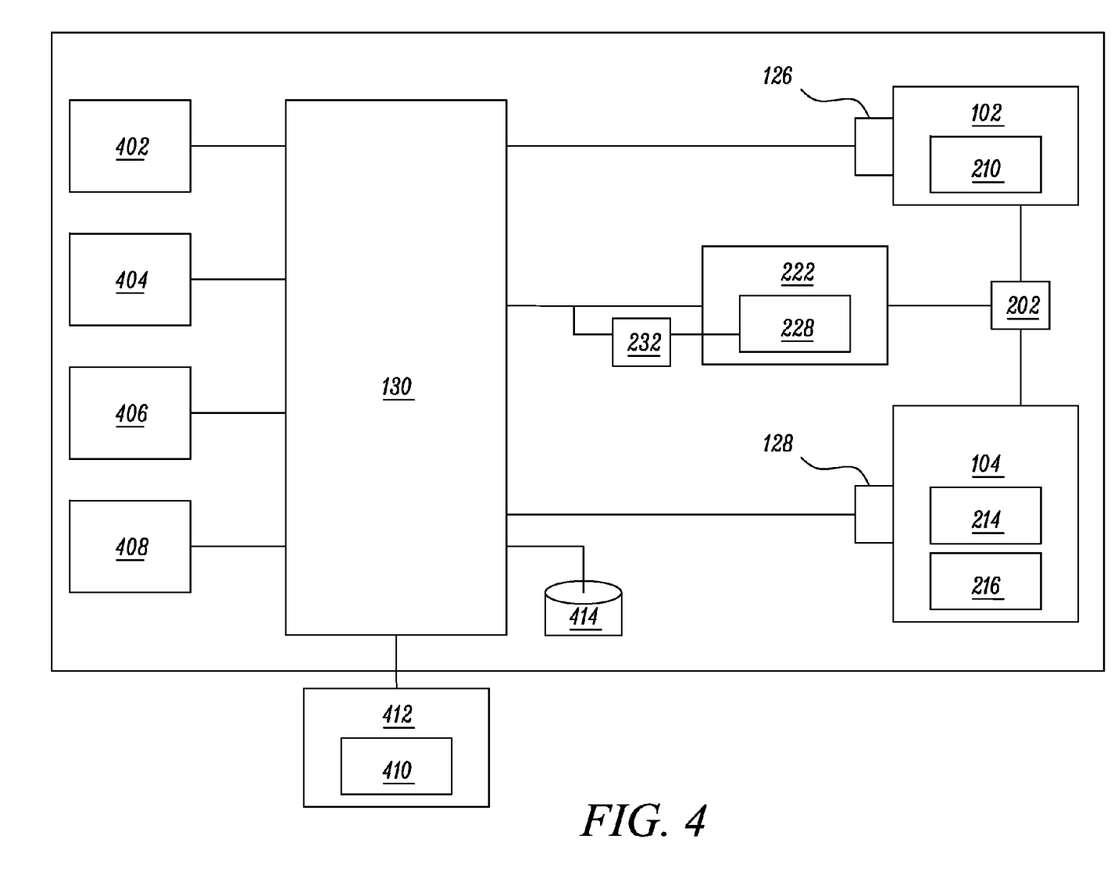
FIG. 4 illustrates a block diagram of the machine, according to an embodiment of the present disclosure.

FIG. 4 illustrates an exemplary block diagram of the machine 100. In an aspect of the present disclosure, the controller 130 is configured to compare the position of the first frame 102 received from the first sensor assembly 126 and the second frame 104 received from the second sensor assembly 128 to determine the relative position of the second frame 104 with respect to the first frame 102. Further, the controller 130 is configured to compare the determined relative position of the second frame 104 with respect to the first frame 102 with the predefined position limit.

If the determined relative position of the second frame 104 with respect to the first frame 102 is greater than the predefined position limit then the controller 130 may detect the possible roll-over event. In addition to the first and the second sensor assemblies 126, 128, the controller 130 may determine other parameters associated with the machine 100 to determine the predefined position limit of the machine 100. For example, the controller 130 may be connected to a speed sensor 402, a direction sensor 404, a slope sensor 406, and a weight sensor 408 to determine the predefined position limit for the machine 100.

The speed sensor 402 is configured to measure the speed of the machine 100 and provide a signal to the controller 130 indicative of the measured speed. For example, the speed sensor 402 may measure wheel speed, transmission speed, and/or engine speed of the machine 100. The direction sensor 404 is configured to detect forward or reverse movement of the machine 100 and provide an output signal to the controller 130 indicative of the same.

Further, the slope sensor 406 is configured to measure the slope of the ground under the machine 100, i.e., an inclination of the machine 100 and provide an output signal to the controller 130 indicative of the measured slope. For example, the slope sensor 406 may be an inclinometer or any other slope sensor known in the art. Furthermore, the weight sensor 408 is configured to detect a weight distribution of the first and the second frame 102, 104 of the machine 100. The controller 130 may use the inputs from the sensors 402-408 along with the relative position of the second frame 104 with respect to the first frame 102 to detect the possible roll-over event may occur. Although, the sensors 402-408 are shown individual components associated with the machine, it will be understood by a person having ordinary skill in the art that these sensors 402-408 may be part of the sensor assemblies 126 and 128 associated with the first and the second frames 102, 104 respectively.

In an aspect of the present disclosure, the controller 130 is configured to selectively lock the inter-axle differential 222 by engaging the lock 228 when the possible roll-over event is detected. For example, when the relative position of the second frame 104 with respect to the first frame 102 is greater than the predefined position limit then the controller 130 may automatically lock the inter-axle differential 222. In an exemplary aspect of the present disclosure, the controller 130 may be connected to the valve 232 associated with the clutch assembly 230 of the lock 228, such that the controller 130 controls the clutch assembly 230 to automatically lock the inter-axle differential 222. The automatic engaging of the clutch assembly 230 of the lock 228 associated with the inter-axle differential 222 may lock the second frame 104 with the first frame 102, thereby preventing individual rollover of the second frame 104.

In an aspect of the present disclosure, the controller 130 may be configured to further send an alert to the operator of the machine 100 and/or the administrator of the machine 100 located at a remote location when the possible roll over event is detected by the controller 130. In an exemplary embodiment of the present disclosure, the controller 130 may be connected to a display device 410 located at a remote operator station 412 to send the alert to the administrator of the machine 100 sitting at the remote operator station 412. For example, the alert may be a text message, a visual and/or audio warning message, etc., indicating that the machine 100 is operating outside the safety limits and may encounter a possible roll-over. Also, the alert may indicate prevention of any hoisting, dumping and/or excavation function to be performed by the machine 100. In response to the alert displayed on the display device, such as the display device 410, the operator and/or the administrator of the machine 100 may reduce the speed or correct the operating position of the machine 100 to avoid the roll-over event of the machine 100 and/or the individual roll-over of the second frame 104.

Furthermore, the controller 130 may be configured to save the received position information of the first and the second frames 102, 104, the relative position of the second frame 104 with respect to the first frame 102 etc., in a database 414. In an exemplary aspect of the present disclosure, the database 414 may be positioned within the machine 100 and/or may be a remotely located database, such as at the remote operator station 412 or at a centrally located network station (not shown).

However, in case the machine 100 encounters a roll-over event, such as when the operator of the machine 100 continues to operate outside the safety limit as indicated by the alert displayed by the controller 130, then the controller 130 may store the details of the roll-over event in the database 308. For example, the controller 130 may store the date, time, machine name and type etc, associated with the roll-over event.

INDUSTRIAL APPLICABILITY

The industrial applicability of the controller 130 of the machine 100 for preventing roll-over the machine 100 and/or the second frame 104 individually described herein will be readily appreciated from the foregoing discussion.

Articulated machines such as articulated trucks with a payload carrier, and ejector mechanisms typically include two frames such as the tractor unit and the payload carrier which is connected to the truck via an articulation joint. The articulation joint enables the frames to roll and yaw with respect to each other.

Generally these articulated machines are employed during construction and excavation and may be operated on uneven terrains. As a result, one of the frames may be positioned at an unsafe roll and/or yaw angle and may cause the entire machine to roll-over. Alternatively, if the articulated machine has an open container, such as an open carrier on one of the frame, any material in the container may fall out on uneven terrain if the machine operates beyond the safety limits of the roll and yaw angles. Furthermore, since the roll and yaw angles of the frames are independent of each other, the operator may be unaware of the unsafe roll and yaw angles which may result in possible roll over of the machine.

The controller 130 of the present disclosure, detects possible roll-over events of the machine 100 and automatically locks the inter-axle differential 222 by automatically engaging the lock 228 between the first and the second frame 102, 104. Therefore, the first frame 102 acts as a counterweight to the second frame 104 and prevents individual rolling over of the second frame 104 and further the machine 100. Such automatic locking of the inter axle differential 222 may be done during dump operations of the machine 100. Also, the controller 130 alerts the operator and/or the administrator of the machine 100 located at the remote operator station 412 that the machine 100 is operating at unsafe roll and yaw angles. The operator may correct the operating angles, such as the roll and/or the yaw angle of the second frame 104 with respect to the first frame 102, or speed of the machine 100 or angle of the machine 100 with respect to the ground so as to avoid any possible roll over events of the machine 100. However, if the operator and/or the administrator of the machine 100 does not correct the operating conditions of the machine 100 and a roll-over event occurs, then the controller 130 may store the details of the roll-over events such as the date, time, machine name, machine type etc., in the database 414 for future references.

Figure 5:
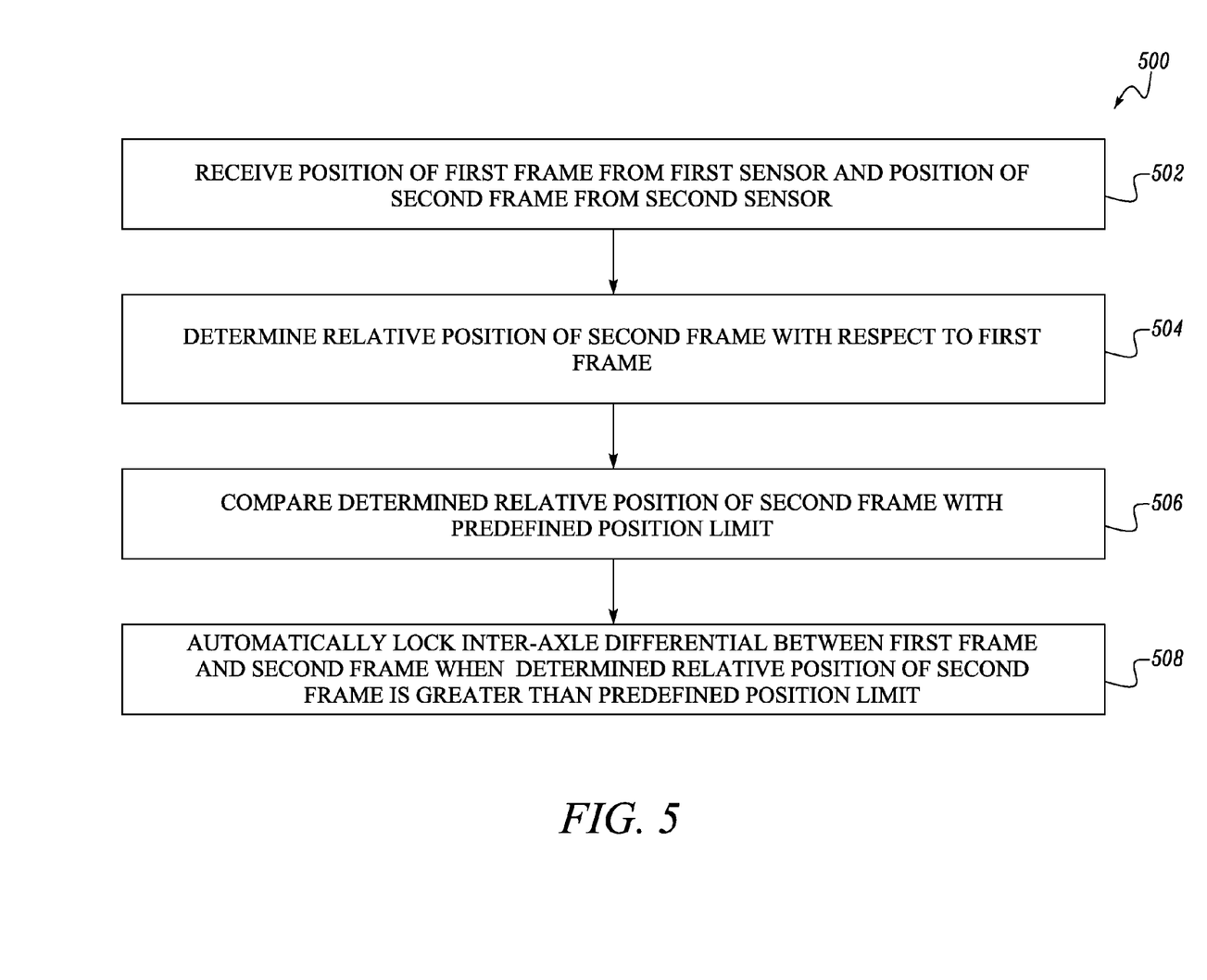
FIG. 5 illustrates a flowchart of a method of preventing the machine from rolling over.

FIG. 5 illustrates an exemplary flowchart of a method 400 of preventing roll over of the machine 100 having the first and the second frame 102, 104. Initially, at step 502, positions of the first frame 102 and the second frame 104 are received from the first sensor 126 and the second sensor 128 respectively. In an exemplary aspect of the present disclosure, the position information is multi-axis position of the first and the second frames 102, 104. In an embodiment of the present disclosure, the sensors 126, 128 may be multi-axis inertia sensors. In various alternative embodiments, the sensors 126, 128 may be any type of sensors capable of determining a pitch, a yaw and/or roll angle of the second frame 104 with respect to the first frame 102. For example, the sensors 126, 128 may be an accelerometer or a gyroscope sensor. Further, the sensors 126, 128 may be piezoelectric, capacitive, potentiometric, hall effect, magnetorestrictive or any other type microelectromechanical sensors.

At step 504, a relative position of the second frame 104 with respect to the first frame 102 is determined. In an exemplary aspect of the present disclosure, the relative position of the second frame 104 with respect to the first frame 102 is determined by comparing the positions of the first frame 102 and the second frame 104 as received from the first and the second sensors 126, 128 respectively. For example, the relative position of the second frame 104 with respect to the first frame 102 may be a roll-over angle A and/or a pitch angle of the body 118 with respect to the first frame 102. As will be understood by a person having ordinary skill in the art that the roll-over angle A may be indicative of the angle of the tilted second frame 104 with respect to the first frame 102 in the raised position 122 on the slopped ground. In an aspect of the present disclosure, the speed of the machine 100, the weight of the load on the body 118 of the second frame 104, slope of the ground, direction of movement of the machine 100, etc. may also be used to determine the relative position of the second frame 104 with respect to the first frame 102.

Further, at step 506, the relative position of the second frame 104 with respect to the first frame 102 is compared with the predefined position limit. In an exemplary embodiment, the predefined position limit may be a possible roll-over angle value, as set by the administrator of the machine 100 which would define safety limits of the machine 100 according to possible roll-over events. For example, if the determined relative position of the second frame 104 with respect to the first frame 102 is greater than the predefined position limit then the machine 100 is determined to be operating beyond the safety limits. In such case, when the controller 130 determines that the machine 100 is not operating within the safety limits then a possible roll-over event may be detected.

Furthermore, at step 508, inter-axle differential 222 between the first and the second frames 102, 104 may be automatically locked when the determined relative position of the second frame 104 with respect to the first frame 102 is greater than the predefined position limit. In an exemplary embodiment, the inter axle differential 222 may be automatically locked by automatically engaging the clutch assembly 230 of the lock 228, when the possible roll-over event is detected by the controller 130. The automatic locking of the inter-axle differential 222 may lock the second frame 104 with the first frame 102, thereby preventing individual roll-over of the second frame 104.

Furthermore, an alert is sent to the operator of the machine 100 and/or the administrator of the machine 100 located at the remote operator station 412 when the possible roll over event is detected. For example, the alert may be a warning in the form of a text, audio and/or visual warning. In an exemplary aspect of the present disclosure, the operator and/or the administrator of the machine 100 may reduce the speed or correct the operating position of the machine 100 to avoid the roll-over event of the machine 100 and/or the second frame 104 individually in response to the alert.

Furthermore, the received position information of the first and the second frames 102, 104, the relative position of the second frame 104 with respect to the first frame 102 etc., are stored in the database 414. However, in case the machine 100 encounters a roll-over event, such as when the operator of the machine 100 continues to operate outside the safety limit as indicated by the alert displayed by the controller 130, then the details of the roll-over event may be stored in the database 414. For example, the date, time, machine name and type etc., associated with the roll-over event may be stored in the database 414.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A method of preventing an articulated machine from rolling over, the articulated machine having a first frame and a second frame, the method comprising:
    receiving a position of the first frame from a first sensor provided on the first frame and a position of the second frame from a second sensor provided on the second frame;
    determining a relative position of the second frame with respect to the first frame by comparing the position of the first frame and the position of the second frame received from the first sensor and the second sensor;
    comparing the determined position of the second frame with a predefined position limit; and
    automatically locking an inter axle differential between the first frame and the second frame when the determined position of the second frame is greater than the predefined position limit.

2. The method of claim 1, wherein receiving the position of the first frame and the second frame further comprises receiving multi-axis position information of the first frame from the first sensor and the second frame from the second sensor.

3. The method of claim 1, wherein the first sensor and the second sensor are multi-axis inertia sensors.

4. The method of claim 1, wherein automatically locking the inter axle differential further includes selectively engaging a clutch assembly associated with the differential.

5. The method of claim 1, wherein selectively engaging the clutch assembly further includes selectively controlling a valve associated with the clutch assembly.

6. The method of claim 1, wherein determining the relative position of the second frame with respect to the first frame further comprises determining at least one of a relative pitch angle and a roll angle of the second frame with respect to the first frame.

7. The method of claim 1 further comprising alerting an operator of the machine when the determined position of the second frame is greater than the predefined position limit.

8. The method of claim 1 further comprising displaying a warning on a display device provided on an operator station of the machine, the warning indicative of a possible roll-over event when the determined position of the second frame is greater than the predefined position limit.

9. The method of claim 1 further comprising storing the position of the first frame and the second frame, and the determined position of the second frame with respect to the first frame in a database.

10. The method of claim 1 further comprising detecting and storing information associated with a roll-over event of the machine.

11. An articulated machine comprising:
    a first frame supported by a front wheel assembly;
    a second frame supported by a rear wheel assembly;
    a first sensor provided on the first frame and configured to provide a position of the first frame;
    a second sensor provided on the second frame and configured to provide position information of the second frame;
    a drive train configured to couple the front and the rear wheel assembly, the drivetrain having an inter axle differential configured to facilitate the front and the rear wheel assembly to move at different speeds; and
    a controller operatively coupled to the sensors and the inter axle differential, the controller being configured to:
        compare the position of the first frame received from the first sensor with the position of the second frame received from the second sensor to determine a relative position of the second frame with respect to the first frame;
        compare the determined relative position of the second frame with a predefined position limit; and
        selectively lock the inter axle differential when the determined relative position of the second frame is greater than the predefined position limit.

12. The articulated machine of claim 11, wherein the first and the second sensors are multi-axis inertia sensors.

13. The articulated machine of claim 12, wherein the first and the second multi-axis inertia sensors are configured to determine multi-axis position of the first and the second frames respectively.

14. The articulated machine of claim 11, wherein the determined relative position of the second frame with respect to the first frame is at least one of a pitch angle and a roll angle of the second frame with respect to the first frame.

15. The articulated machine of claim 11, wherein the inter axle differential includes a clutch assembly configured to be selectively engaged and disengaged to lock and unlock the inter axle differential respectively.

16. The articulated machine of claim 15, wherein the controller is configured to selectively engage and disengage the clutch assembly by controlling a valve associated with the clutch assembly.

17. The articulated machine of claim 11, wherein the controller is further configured to send an alert to an operator of the machine when the determined position of the second frame is greater than the predefined position.

18. The articulated machine of claim 17, wherein the controller is further configured to display a warning on a display device provided on an operator station of the machine, the warning indicative of a possible roll-over event when the determined position of the second frame is greater than the predefined position.

19. The articulated machine of claim 11, wherein the controller is operatively coupled to a database, and wherein the database stores the position of the first frame received from the first sensor and the position of the second frame received from the second sensor.

20. The articulated machine of claim 11, wherein the controller is further configured to detect and store a roll-over event of the machine.

* * * * *

UNITED STATES PATENT AND TRADEMARK OFFICE
CERTIFICATE OF CORRECTION

PATENT NO.        : 9,114,705 B2
APPLICATION NO.   : 14/072839
DATED             : August 25, 2015
INVENTOR(S)       : Fazal A. Goraya et al.

Page 1 of 1

It is certified that error appears in the above-identified patent and that said Letters Patent is hereby corrected as shown below:

On The Title Page, In Item (72) Inventors:

"Stephen Thompson, Sunderland, (UK)" has been added as an inventor.

Signed and Sealed this
Twenty-first Day of June, 2016

Michelle K. Lee
*Director of the United States Patent and Trademark Office*